May 19, 1964
J. D. SHAW ETAL
3,133,491
X-RAY FILM HOLDER
Filed March 16, 1961
2 Sheets-Sheet 1
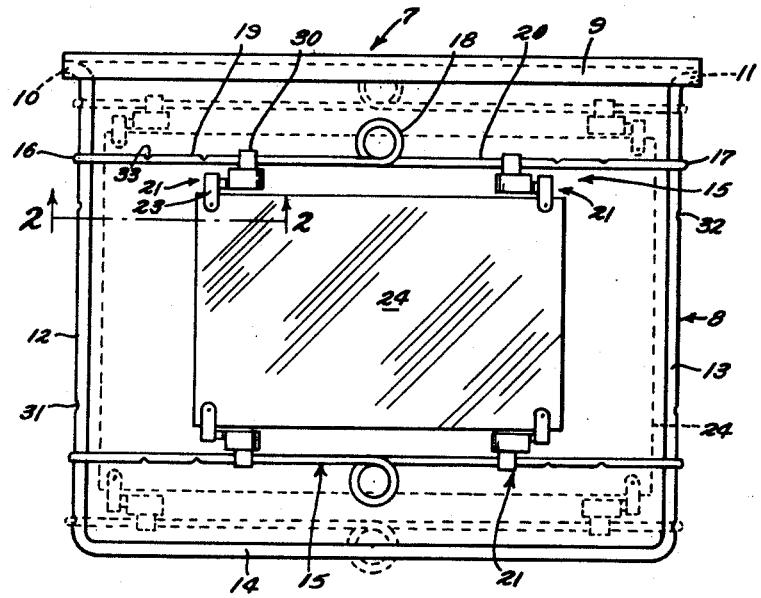
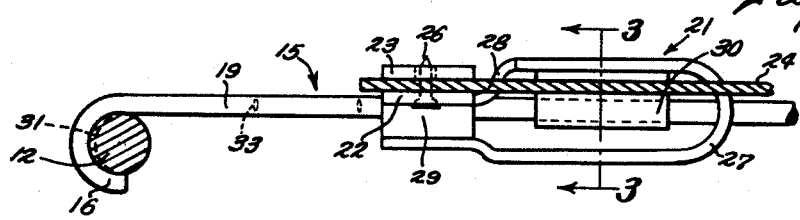
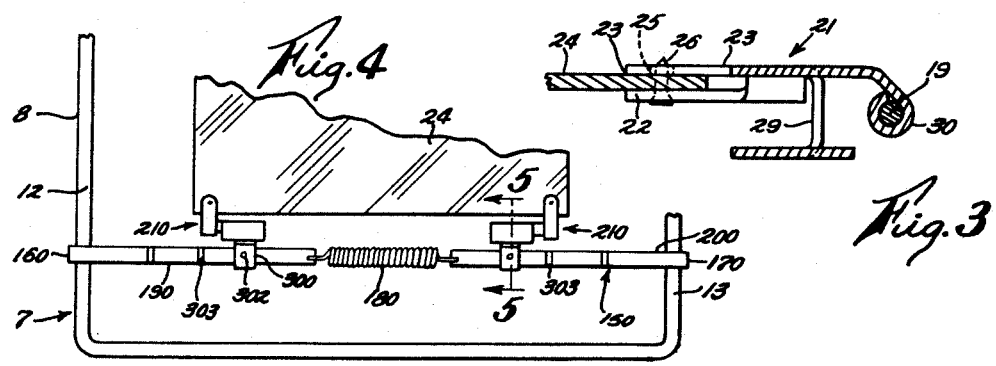
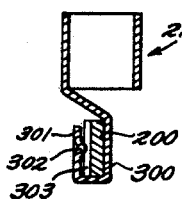
INVENTORS
Joseph D. Shaw
BY Adele G. Shaw
ATTY.

May 19, 1964

J. D. SHAW ETAL 3,133,491

X-RAY FILM HOLDER

Filed March 16, 1961

INVENTORS
Joseph D. Shaw
Adele G. Shaw
BY
Walter S. Murray
ATTY.

United States Patent Office 3,133,491
Patented May 19, 1964

3,133,491
X-RAY FILM HOLDER
Joseph D. Shaw and Adele G. Shaw, both of 244 Kemper Road, Springdale, Ohio
Filed Mar. 16, 1961, Ser. No. 96,146
5 Claims. (Cl. 95—100)

The present invention generally relates to photographic film holders employed in the dark room development processes of exposed X-ray film.

In recent years the X-ray machine has come into extensive use in industry, hospitals and physicians' offices and in the latter instances the exposed film has been developed at the office by the physicians or their office technicians. In the case of the physician, for example, X-ray film is supplied in several standard sizes and the film size selected for use will be determined by the area of the particular patient's body to be recorded for examination. Thus, not only the large hospital laboratories, but individual physicians now carry a large assortment of standard sized X-ray film holders for the film developing processes which, in the case of the individual physician, requires the purchase of a great number of frames or holders representing a relatively large outlay in money and the creation of a storage problem for lack of office space.

Our present invention is principally directed to a photographic film holder capable of detachably mounting all standard sizes of film for any X-ray machine and having a novel and improved adjustment means that may be readily and quickly manipulated to mount the various sizes of such film, even though the mounting be done in the dark room.

Another object of the invention is to provide an adjustable film holder structure that is capable of efficient storage in a small space and which can be readily adjusted to a clamping position to selectively mount any one of a number of standard sized X-ray film.

A further object of the invention is to provide a single expansible holder structure for all sizes of X-ray film for any type of X-ray machine.

Another object is to devise a film holder with efficient means for adjustably attaching a clamp to the film to yieldably hold the film in a flat condition in the holder during the required steps in the film developing process.

Other objects will appear from the following description and claims when considered together with the accompanying drawings, wherein:

FIG. 1 is a front elevational view of one form of our X-ray film holder.

FIG. 2 is an enlarged, fragmental view taken on line 2—2 of FIG. 1.

FIG. 3 is a section taken on line 3—3 of FIG. 2.

FIG. 4 is a fragmental, front elevational view of a modification of our X-ray film holder.

FIG. 5 is an enlarged section taken on line 5—5 of FIG. 4.

Figure 6:
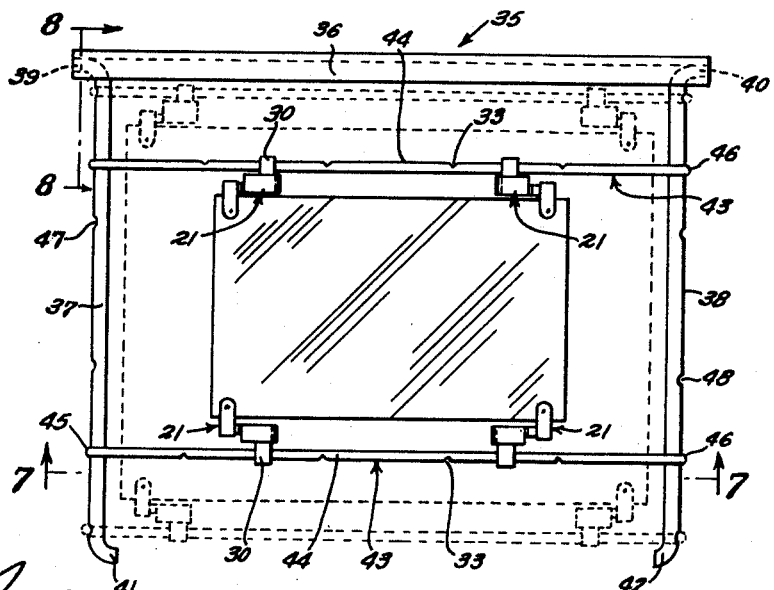
FIG. 6 is a front elevational view of another modified form of our X-ray film holder.

Referring now to FIGS. 1-3 of the drawings showing one form of our invention the numeral 7 generally indicates a rigid, rectangular frame made of a chemically impervious material such as stainless steel or a plastic and comprising a U-shaped member 8 preferably constructed from round stock and a straight, channel-shaped member 9 extending laterally across the open end of the U-shaped member and connected at its ends, as by welding, to the outturned ends 10 and 11 of parallel, longitudinal members 12 and 13, respectively, of the U-shaped member. The parallel, longitudinal members 12 and 13 are therefore interconnected at one of their common ends by the transverse channel 9 and are integrally connected together at their opposed common ends by a lateral portion 14 of the U-shaped member 8. According to our invention the U-shaped member and the channel member define a frame opening that is substantially the same size as the largest standard size of photographic film that may be processed in any X-ray machine, when that film is lying flatwise within the confines of said opening. Thus, the frame will accept and encompass all standard sizes of photographic film that may be exposed in any X-ray machine, it being an object of our invention to provide an adjustable clamp structure that may be mounted on and within the frame for restrainably securing each one of a number of different sized X-ray films within the frame for the purpose of yieldably maintaining each film in a flat condition during the steps in the developing process that follows the exposure of each film in an X-ray machine.

A longitudinally adjustable, film support element 15 extends laterally between the longitudinal frame members 12 and 13, and as best illustrated in FIGS. 1 and 3, said element consists of a single length of round flexible wire stock having a hook 16 and 17 formed on each of its terminal ends which slidably engages the frame members 12 and 13, respectively, said terminal ends being movable on the members in a longitudinal direction. Each hook is illustrated as having an opening therein large enough for the passage of its respective frame member therethrough in order that the support element 15 may be mounted on or removed from the frame, but it is contemplated that said hooks could be closed rings if desired, for permanently mounting the elements on the frame. The hooks are retained under continuous, inwardly exerted tension on the frame to increase their frictional engagement with their respective frame members by a biasing means indicated in FIG. 1 of the drawings as a coiled spring portion 18 formed centrally in the body of the support member 15 and dividing the said member into two opposed support sections 19 and 20. The spring portion also retains the element sections 19 and 20 in longitudinally flexible conditions within the frame.

Each of the two support sections 19 and 20 of the element 15 have a film clamp 21 mounted thereon for transverse sliding movement and as the film clamps are identical in function and structure and each co-operates with its respective support section in the same way only one of the clamps will now be described. With particular reference to FIGS. 2 and 3 the film clamp is shown as stamped and formed from a single piece of flexible sheet metal and comprises two opposed jaws 22 and 23 that are biased toward one another to secure between them a corner portion of a photographic X-ray film 24. The jaws pivotally engage the film and to this end the jaw 23 is formed with an aperture 25 therethrough which receives a sharp film piercing projection 26 fixed on the other jaw 22. The jaw 22 is connected to the compressed U-shaped body 27 of the clamp by an offset portion 28 whilst the jaw 23 is connected to the opposite side of said body by an upstanding arm portion 29. The clamp is released by pressing together the U-shaped body while tension built into the body holds the jaws in clamped positions on the film.

An integral ear is joined to the U-shaped body of the clamp and it is developed into a circular follower sleeve 30 which loosely encircles the support section 19 of the element 15, said sleeve thereby having lateral sliding movement on the element. In this connection it is to be noted that the jaws 22 and 23 extend from one side of the clamp (FIG. 1) and the sleeve 30 extends from the opposite side of the clamp, said sleeve and jaw being disposed on opposite sides of a longitudinal center line of the clamp. As has been stated the jaws 22 and 23 are biased into clamping engagement on opposite sides of the film 24 whilst the pointed projection 26 on one of the jaws pierces the film and passes through the aperture 25 on the opposite jaw. Thus, when a film is clamped in our frame the support element 19 is somewhat flexed inwardly to provide longitudinal tension between the opposed members 15 whilst a pivotal connection is provided between the clamp jaws and the film. This will tend to cause the sleeve 30 to tilt on the support section 19 to secure a clamping torque between the clamp follower sleeve and the support to preclude movement of the clamp on the element after it has been attached to the film.

Now with reference to the modified form of our device shown in FIGS. 4 and 5 it will be noted that a film support element 150 comprises opposed sections 190 and 200 made of straight metal stock having an irregular form in cross section (FIG. 5), the outer end of each section 160 and 170 being provided with a hook portion which slidably engages its respective frame member 12 and 13. The sections are biased toward one another by a contractile spring 180 having each end secured to one of the adjacent ends of the sections 190 and 200. As in the case of the modification shown in FIGS. 1–3 each section has mounted thereon for lateral sliding movement a film clamp 210, each of the clamps being mounted on its respective support section by an open flexible sleeve of conforming irregular contour with the body of the support. As shown in FIG. 5 the free end 301 of the sleeve 300 is provided with an inwardly directed detent 302 which is adapted to co-operate with any one of a lateral row of slots 303 formed longitudinally in the support sections 190 and 200. The detent and slots co-operate to hold the film clamps 21 in adjusted lateral positions on the support element 150 and said slots are positioned on the support elements in locations that will determine the positions of the clamps for supporting X-ray film of different standard dimensions. In the dark room the clamp positions represented by the slots may be readily located by the operator's sense of touch.

With reference to FIG. 1 it will be noted that a longitudinal row of spaced notches 31 and 32 may be formed in the longitudinal frame members 12 and 13, respectively, so that the support elements 15 may be located in their proper longitudinal positions in the frame and a set of notches are also formed along the lateral extent of the support elements 15 for locating and holding the clamps in lateral positions, said sets of notches being indicated by the reference numeral 33.

Figure 7:
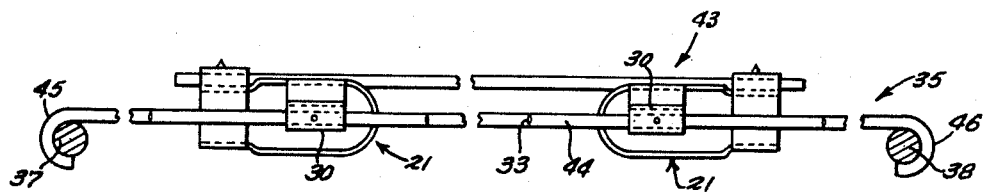
FIG. 7 is an enlarged, fragmental section taken on line 7—7 of FIG. 6.
Figure 8:
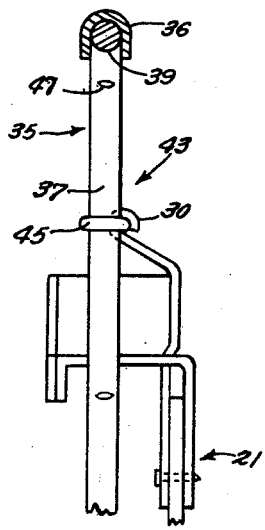
FIG. 8 is an enlarged section taken on line 8—8 of FIG. 6.

With reference to the further modification of our holder that is illustrated in FIGS. 6–8 of the drawings the numeral 35 generally refers to a rectangular film holding frame comprising a straight, laterally extending channel-shaped member 36, and a pair of opposed, longitudinally extending members 37 and 38, each longitudinal member having an outwardly turned end 39 and 40, respectively, that is welded, or otherwise fastened to an end of the member 36. The free ends 41 and 42 of the members 37 and 38, respectively, are turned toward one another to provide stop means for the film support element 43 that is slidable on and extends crosswise between the longitudinally extending members 37 and 38.

The film support element 43 consists of a single, straight piece of flexible and resilient stock 44 that has hooks 45 and 46 formed on its ends which slidably engage the longitudinal members 37 and 38, respectively.

As with the case of the modification shown in FIGS. 1–3 of the drawings the film support element 43 has a film clamp 21 mounted on each of its side sections for lateral sliding movement, the mounting means for each clamp being the circular follower sleeve 30 which loosely encircles the support element. The stock has a lateral row of spaced notches 33 formed therein which co-operate with the follower sleeves to provide positive positioning means for holding the clamps 21 in selected positions to support the desired film in the frame whilst the longitudnal members 37 and 38 each have a longitudinal row of spaced apart notches 47 and 48, respectively, therein to fix the adjusted longitudinal positions of the film support elements 43 in the frame for the various sizes of film held therein.

It is contemplated that the members 37 and 38 will be constructed of a chemically impervious material such as flexible stainless steel stock or a flexible plastic and that they will normally diverge slightly outwardly from each other from their connections with the cross-member 36. These members 37 and 38 are compressed toward one another when one or more of the film support elements 43 are mounted between them thus placing the support elements in spring biased tension. Such tension secures a longitudinal flexing of the support elements which is transmitted through the clamps 21 to the film to hold said film flat for the various steps of the film developing process.

What is claimed is:

1. In a film developing holder the combination comprising a rigid frame having parallel, longitudinal members interconnected at each of their common ends by cross-members, said members defining an opening substantially the same size as a large, standard sized X-ray film, a film support element extending crosswise between the longitudinal members and comprising two sections each having a sliding connection with one of the longitudinal frame members, a longitudinally flexible means on the element biasing the two sections inwardly toward one another, a film clamp slidably mounted on the film support section for lateral movement thereon, and means for locking the clamp in adjusted film holding position on the section, whereby the adjusted position of the film clamp can be selectively controlled in both a longitudinal and a lateral direction to selectively hold all standard sizes of film in the frame.

2. In a film developing holder the combination comprising a rigid frame having parallel, longitudinal members interconnected at each of their common ends by cross-members, said members defining an opening substantially the same size as a large, standard size X-ray film, a film support element extending crosswise between the longitudinal members and comprising two identical sections each having a sliding connection with one of the longitudinal frame members, a longitudinally flexible means located centrally of the element for biasing the two sections inwardly toward one another, a film clamp slidably mounted on each of the film support sections for lateral movement thereon, and means for locking each clamp in adjusted film holding position on the section of the element, whereby the adjusted position of each film clamp can be selectively controlled in both a longitudinal and a lateral direction to selectively hold all standard sizes of film in the frame.

3. The combination with a rigid film holding frame having two laterally spaced, longitudinal frame members, of a pair of longitudinally spaced apart film support elements each extending crosswise between the frame members and having a sliding connection at each of its terminal ends with a frame member, a contractile spring means disposed centrally of each element biasing the terminal ends toward one another and creating a longitudinally flexible condition in said element, a pair of film clamps mounted for rectilinearly directed sliding movement on each element, each clamp having a pair of clamping jaws, jaw carried means for pivotal connection with the film, and lock means between each clamp and the element for maintaining the clamp in adjusted positions on the element.

4. The organization set forth in claim 3 wherein the lock means comprises a lateral row of grooves formed in the film support element and a spring detent carried by the film clamp and co-operable with selected grooves in the element.

5. The combination with a rigid film holding frame having two laterally spaced, longitudinal frame members, of a pair of longitudinally spaced apart film supporting elements each extending crosswise between the frame members, each of said elements comprising two sections, means for mounting the outer end of each section on a frame member for longitudinal sliding movement thereon, a contractile spring means operatively secured to the adjacent ends of the sections, a film clamp having jaws for pivotally securing a film corner thereto, a sleeve means fixed on the clamp and slidably engaging a section of the support element, the jaws and the sleeve being disposed on opposite sides of the longitudinal center line of the clamp.

References Cited in the file of this patent

UNITED STATES PATENTS

| | | |
|---|---|---|
| 1,879,498 | Richards et al. | Sept. 27, 1932 |
| 1,929,283 | Miller | Oct. 3, 1933 |
| 2,460,871 | Caldarulo | Feb. 8, 1949 |
| 2,524,216 | Weissman | Oct. 3, 1950 |
| 2,550,048 | Durst | Apr. 24, 1951 |

FOREIGN PATENTS

| | | |
|---|---|---|
| 976,333 | France | Oct. 25, 1950 |